(12) United States Patent
Li et al.

(10) Patent No.: US 10,029,129 B2
(45) Date of Patent: Jul. 24, 2018

(54) HIGH-RISE BUILDING ESCAPE APPARATUS

(71) Applicants: Wayne Li, Chadds Ford, PA (US); Tanya Li, Chadds Ford, PA (US)

(72) Inventors: Wayne Li, Chadds Ford, PA (US); Tanya Li, Chadds Ford, PA (US)

( * ) Notice: Subject to any disclaimer, the term of this patent is extended or adjusted under 35 U.S.C. 154(b) by 89 days.

(21) Appl. No.: 15/144,749

(22) Filed: May 2, 2016

(65) Prior Publication Data
US 2017/0312554 A1    Nov. 2, 2017

(51) Int. Cl.
| | |
|---|---|
| A62B 1/20 | (2006.01) |
| A62B 1/22 | (2006.01) |
| B64D 17/24 | (2006.01) |
| B64D 17/78 | (2006.01) |
| A62B 3/00 | (2006.01) |

(52) U.S. Cl.
CPC ............. *A62B 1/22* (2013.01); *A62B 3/00* (2013.01); *B64D 17/24* (2013.01); *B64D 17/78* (2013.01)

(58) Field of Classification Search
CPC .... A62B 1/00; A62B 1/02; A62B 1/04; A62B 1/06; A62B 1/08; A62B 1/10; A62B 1/12; A62B 1/14; A62B 1/16; A62B 1/18; A62B 1/20; A62B 1/22; A62B 3/00; B64D 17/24; B64D 17/78
USPC ......... 182/48, 62, 129, 142; 244/140, 151 R, 244/151 A
See application file for complete search history.

(56) References Cited

U.S. PATENT DOCUMENTS

| | | | | |
|---|---|---|---|---|
| 9,790 A | * | 6/1853 | Winkless | ................. B41C 3/02 101/17 |
| 4,421,204 A | * | 12/1983 | Lawrence | ................. A62B 5/00 182/142 |
| 6,607,166 B1 | * | 8/2003 | Pichkhadze | ................. B64D 1/14 244/138 R |
| 6,682,017 B1 | * | 1/2004 | Giannakopoulos | .... B64D 17/80 244/138 R |
| 6,708,927 B2 | * | 3/2004 | Chen | ...................... A62B 1/22 182/230 |

(Continued)

*Primary Examiner* — William V. Gilbert

(57) ABSTRACT

A high-rise building escape apparatus enables user to quickly exit a high-rise building in the event of an emergency. It mainly includes a damper which withstands impact of termination of descent and decreases terminal velocity due to its mushroomlike shape, a compartment, side and bottom nets, a parachute, an air source system, hoses, rotatable and fix frames, and a safety belt. The apparatus is operated following the procedure below. A user sets up the fix frame and rotatable frame attaching the dropping parts on the sill of a window or on the top of a balcony, makes the rotatable frame swing to the outside, opens the dropping part pack, fills the high pressure air to the airbags simultaneously through a number of internal hoses and an external hose, and disconnects the hoses. The user then moves from the inside of the building to the compartment in the middle of the damper through the rotatable frame with hands grabbing it, reaches the bottom portion of the compartment, fastens the safety belt, and releases the dropping parts. As a result, the user will move down with the damper, the parachute will be extended, released, and deployed, and the rotatable frame will rotate back. As soon as the user reaches the ground, the user will unbuckle the safety belt, get out of the damper, and release the high pressure air.

5 Claims, 6 Drawing Sheets

(56) References Cited

U.S. PATENT DOCUMENTS

| | | | |
|---|---|---|---|
| 7,252,315 B2* | 8/2007 | Liberato | B66C 1/127 |
| | | | 182/142 |
| 9,321,616 B2* | 4/2016 | May | B66C 23/62 |
| 2010/0252365 A1* | 10/2010 | Feller | A62B 1/08 |
| | | | 182/231 |
| 2014/0069741 A1* | 3/2014 | Bergmann | A62B 1/14 |
| | | | 182/129 |

* cited by examiner

HIGH-RISE BUILDING ESCAPE APPARATUS

FIELD OF THE INVENTION

The present invention relates generally to an inflatable safety apparatus to escape a high-rise building in emergency situations in a sufficiently rapid manner.

BACKGROUND OF THE INVENTION

A lifesaving device which enables rapid escape from a high-rise building is needed for residents in emergency situations such as when a fire is present. Without such device people could be injured or even lose their lives. The various lifesaving devices have been patented previously, including apparatuses using ropes, air bags, parachutes, outside elevators, tubes. The present invention presents a feasible escape apparatus for a high-rise building.

SUMMARY OF THE INVENTION

The purpose of the present invention is to produce a personal escape device for people to quickly exit a high-rise building in the event of an emergency.

The high-rise building escape apparatus of the present invention is shown in design drawings. It is composed of a damper including a plurality of independent airbags with center and side slots, foot slots, internal hoses, check valves, and escape valves, a compartment, side and bottom metallic nets attached to the side and bottom of the damper, a parachute with center and side holes and string connected to the top edge of the damper with lines, a support including a rotatable frame, a fix frame, a clip, a latch, hinges, springs, and a screw, an air source system, an external hose, a quick release hose coupler, a damper quick release, a safety belt, a descent cord, and packing belts that wrap all dropping parts and are connected to the rotatable frame.

The airbags of the damper form a mushroomlike shape which reduce the terminal velocity when the apparatus goes down. The center and side slots of the damper are used to make the apparatus more stable. The flow of the air coming from the side slots forces the apparatus to move away from the building. The side net forms an inclined side wall that allows the apparatus to slide away from the protrusions of the building such as windowsills and balconies. The side net prevents the airbags from breaking when sliding and the side and bottom nets prevent the airbags from damaging when the airbags touch sharp objects during landing. The parachute is used to reduce the terminal velocity. The center and side holes make the apparatus more stable. The string on the edge of parachute canopy is used to make the diameter of the canopy edge smaller to make the parachute easier to slide on the protrusions of the building through the lines and the canopy if the canopy edge or the lines touch them, and reduce the possibility of stopping the canopy by the protrusions. The clip is attached to the rotatable frame and holds the middle of the canopy until the parachute begins to deploy. The air source system could be an air compressor powered by a battery, an inflator using stored gas, a pyrotechnic inflator, or combinations thereof. The opposite sheets of the airbags are connected with intermediate sheets periodically to form a desired shape with the high pressure air. All airbags will fill with the high pressure air simultaneously through a number of the internal houses and the external house and maintain the pressure under working conditions. The check valves carried by the internal houses are used to ensure that if one airbag is broken, other airbags will still work.

DESCRIPTION OF THE PREFERRED EMBODIMENT

Figure 1:
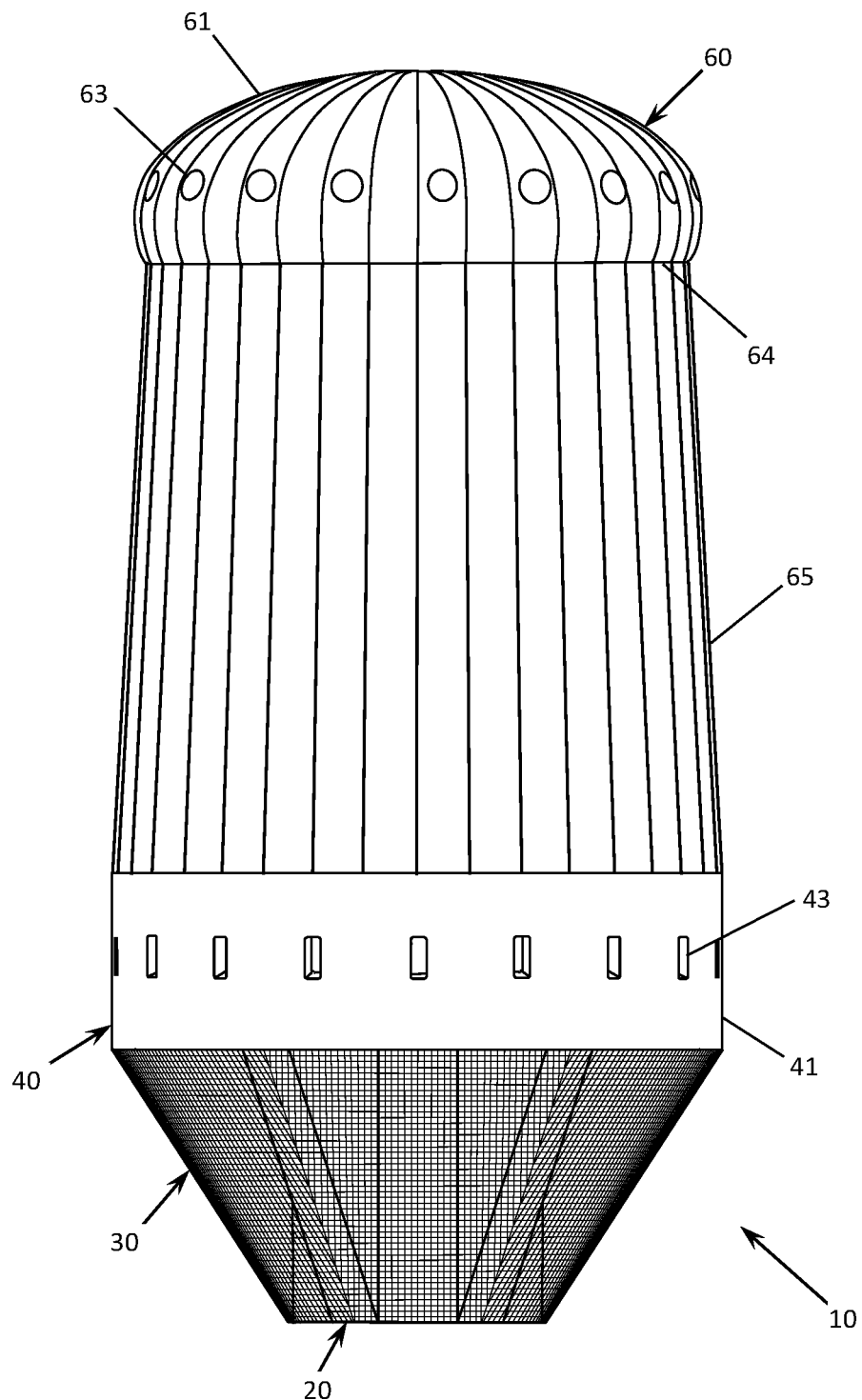
FIG. 1 is a front view of the deployed high-rise building escape apparatus.
Figure 2:
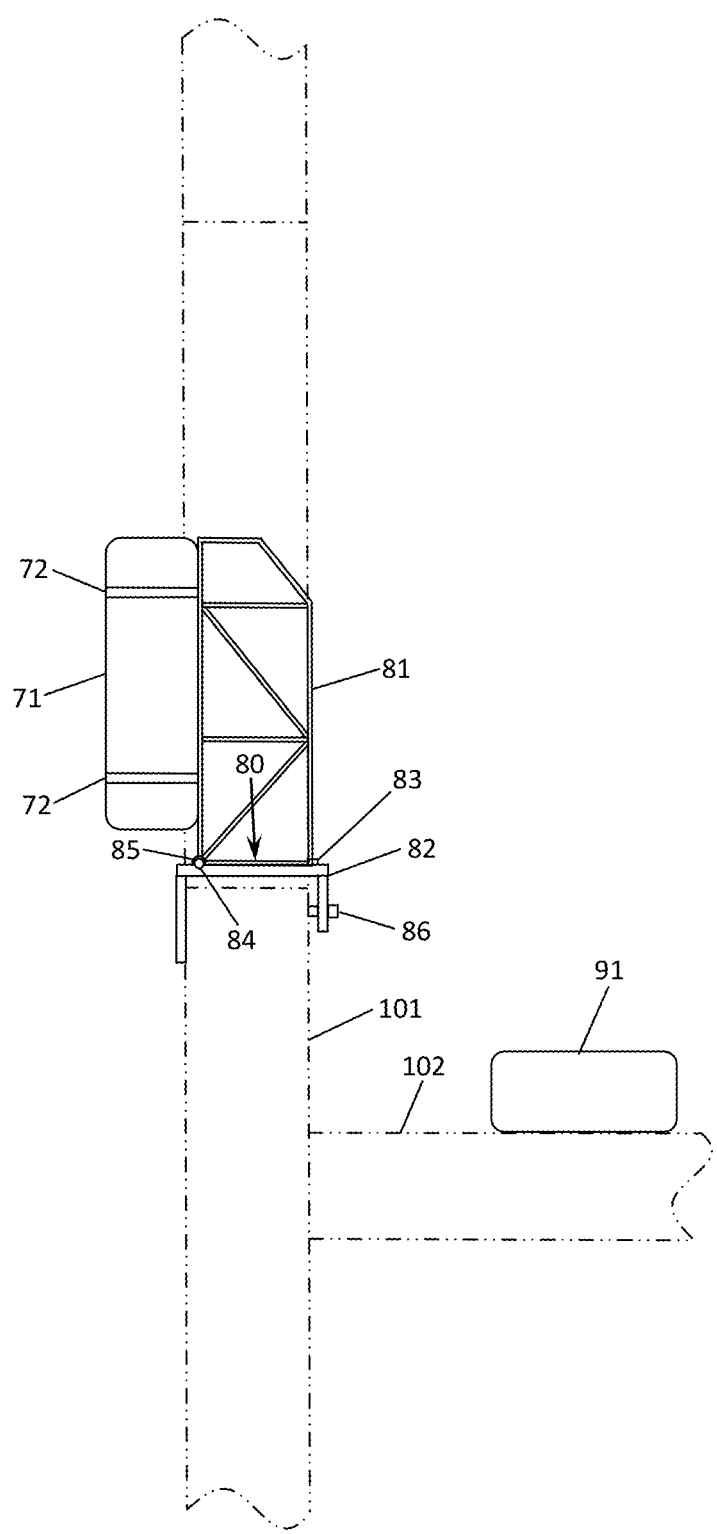
FIG. 2 shows packed dropping parts, support, and air source system.
Figure 3:
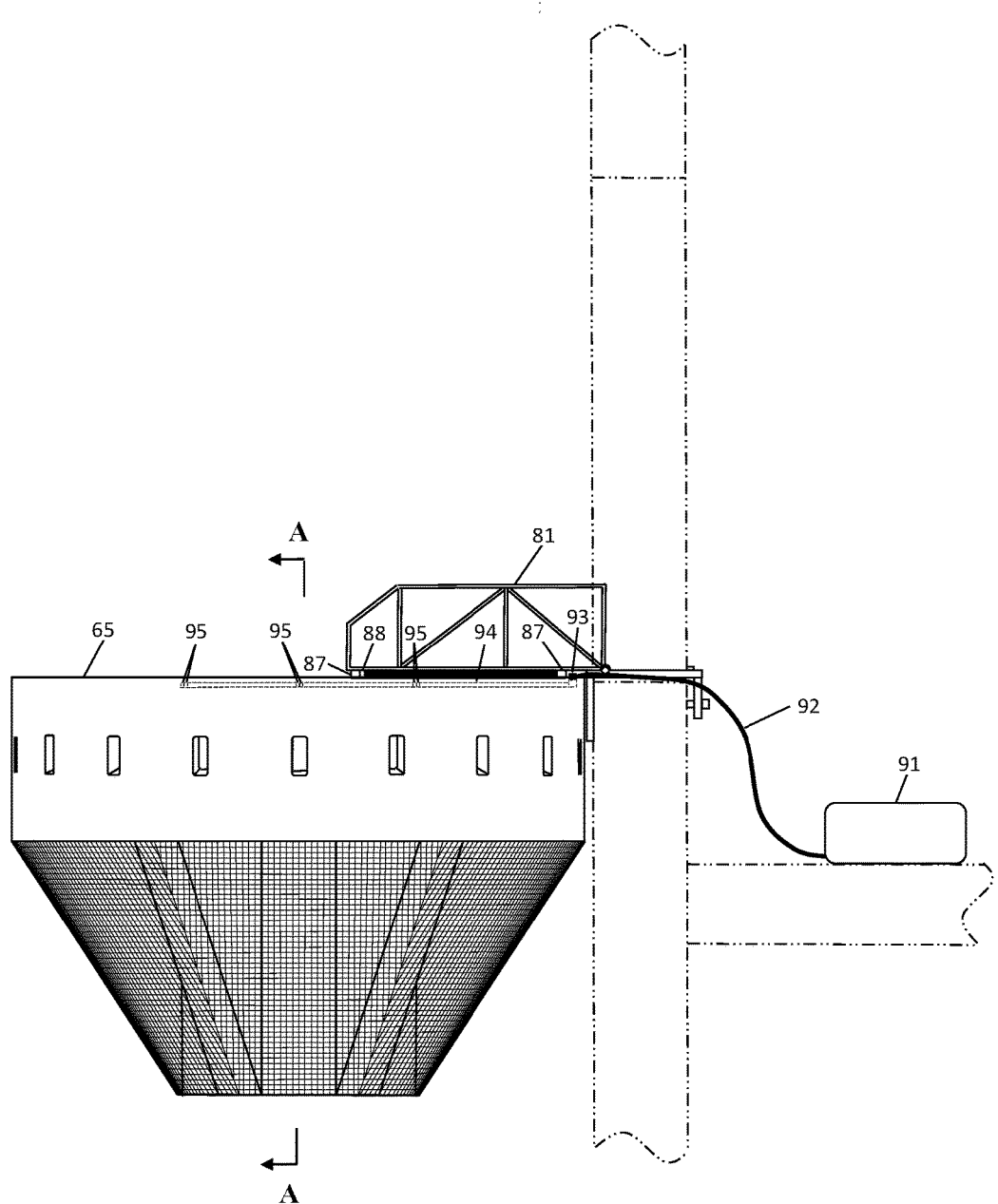
FIG. 3 shows the status of the apparatus after inflating the damper.
Figure 4:
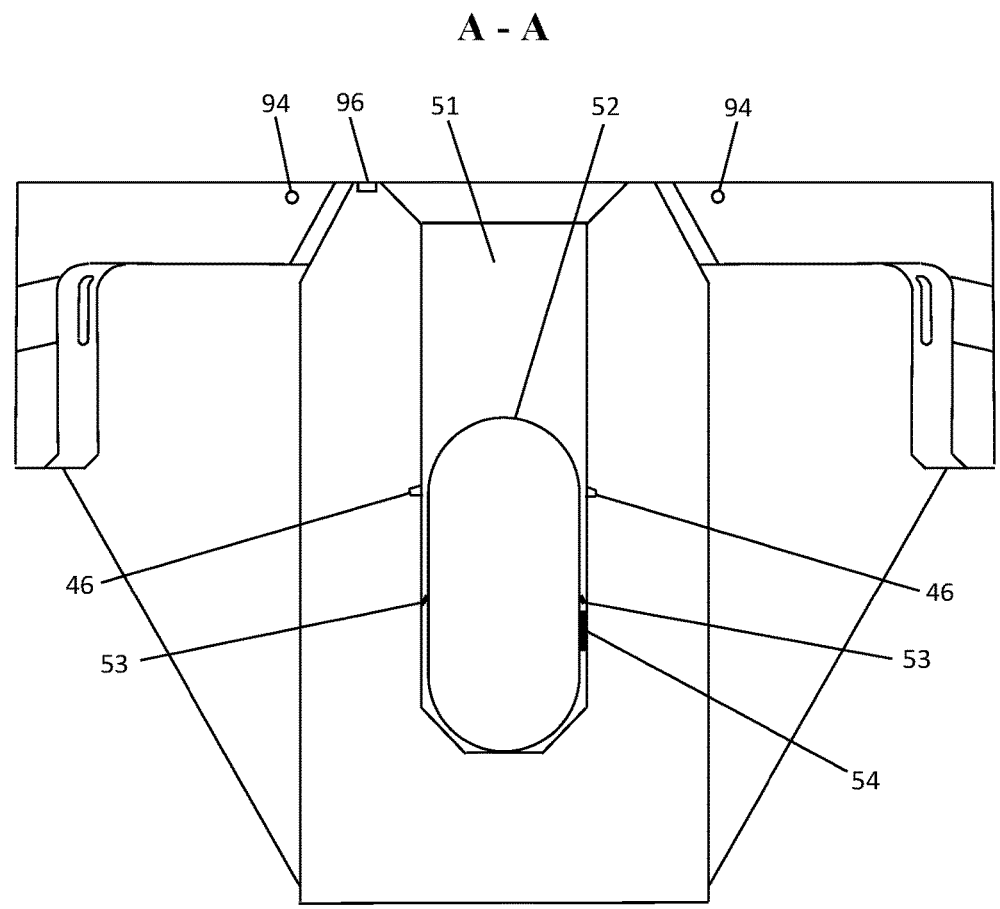
FIG. 4 illustrates a cross-sectional view of the apparatus taken through section A-A of FIG. 3.
Figure 5:
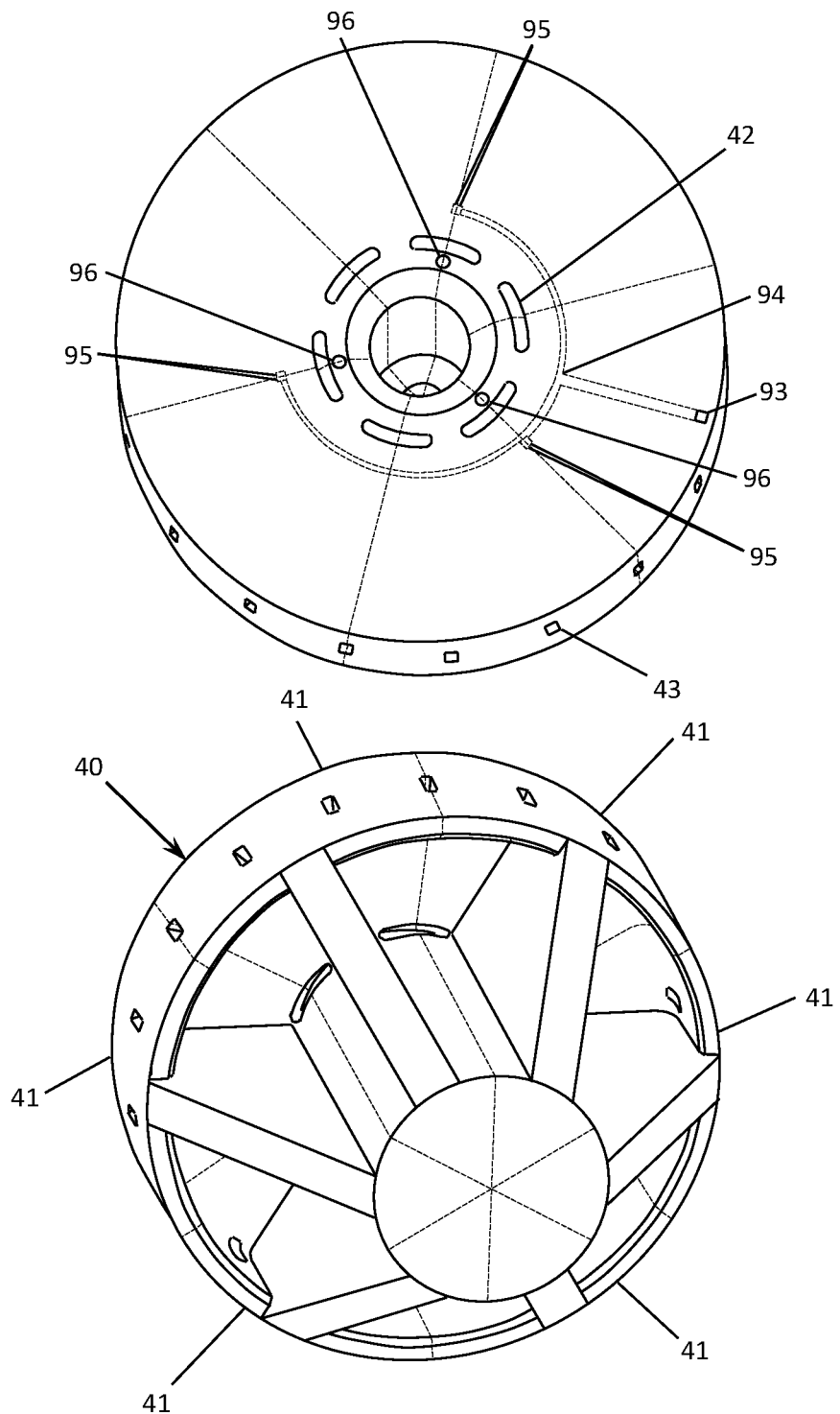
FIG. 5 is perspective views of the damper.
Figure 6:
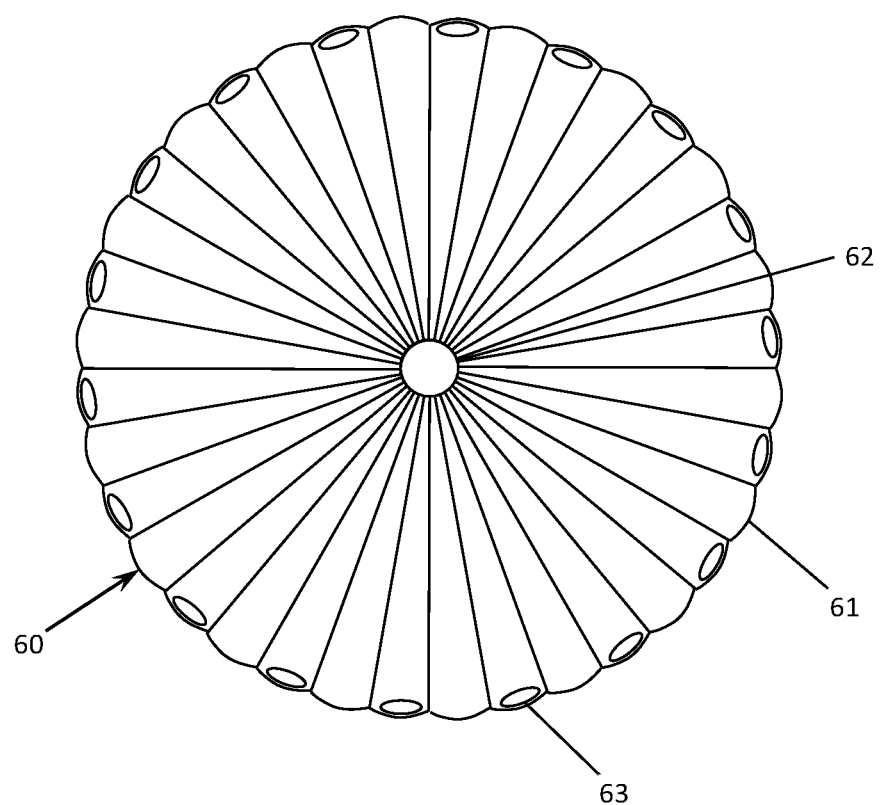
FIG. 6 is a top view of the parachute.

An embodiment of the high-rise building escape apparatus 10 of the present invention is illustrated in FIG. 1-6, including a damper 40 comprising a plurality of independent airbags 41, center slots 42, side slots 43, foot slots 46, internal hoses 94, check valves 95, and escape valves 96, a compartment 51, a side metallic net 30 and bottom metallic net 20 attached to the side and bottom of the damper 40, a parachute 60 with a center hole 62 in the center of a canopy 61, side holes 63 in the side, and a string 64 on the edge connected to the top edge of the damper 40 with lines 65, a support 80 including a rotatable frame 81, a fix frame 82, a clip 88, a latch 83, hinges 84, springs 85, and a screw 86, an air source system 91, an external hose 92, a quick release hose coupler 93, a damper quick release 87, a safety belt 53, a descent cord 54, and packing belts 72 that wrap all dropping parts and are connected to the rotatable frame 81.

All the airbags 41 of the damper 40 form a concave shape which increases air resistance and therefore reduces the terminal velocity when the apparatus 10 goes down while withstanding impact of termination of descent due to energy absorption of airbags underneath the user. The center slots 42 and side slots 43 of the damper 40 are used to make the air get evenly out through the slots and make the damper 40 more stable when the damper 40 is dropped. Without the center slot the damper 40 would trap air and quickly create excess pressure which would then discharge violently over the edges causing violent oscillation. When the damper 40 moves down the air gets out through the side slots 43 and the flow of the air is blocked by the building, which forces the damper 40 to move away from the building as a reaction. The side net 30 forms an inclined side wall. When the wall touches protrusions of the building such as windowsills and balconies, the horizontal component of a contact force would make damper 40 slide away. The side net 30 prevents the airbags 41 from breaking during sliding, and the side net 30 and bottom net 20 reduce damage of the airbags 41 when the airbags 41 touch sharp objects during landing. The parachute 60 is used to reduce the terminal velocity. The center hole 62 and side holes 63 make the dropping more stable. The air flow coming from the side holes 63 is blocked by the building, which pushes the parachute 60 to move away from the building as a reaction. The string 64 on the edge of parachute canopy 61 is used to obtain a circular canopy edge with a smaller diameter to make the parachute 60 slide on the protrusions of the building through the lines 65 and the canopy 61 if the canopy edge or the lines 65 touch them, and reduce the possibility of stopping the canopy 61 by the protrusions. The clip 88 is attached to the rotatable frame 81 and holds the middle of the canopy 61 until the parachute 60 begins to deploy. The air source system 91 is an air compressor powered by a battery, a inflator using stored gas, a pyrotechnic inflator, or combinations thereof. The opposite sheets of the airbags 41 are connected with intermediate sheets periodically to form a desired shape with the high pressure air. All airbags 41 will fill with the high pressure air simultaneously through a number of the internal houses 94 and the external house 92 and maintain the pressure under working conditions. The check valves 95 carried by the internal houses 94 are used for each airbag to ensure that the high pressure air in the individual airbag will not come out. As a result, if one airbag is broken, other airbags will still work.

The operating procedure is as follows. A user puts the air source system 91 on the floor 102 and the fix frame 82 of the support 80 attaching the wrapped dropping parts 71 on the sill of a window on a wall 101 or on the top of a balcony, tightens the screw 86, releases the latch 83 so that the rotatable frame rotates 90 degree about hinges 84 to the outside, opens the packing belts 72, connects the external hose 92 to the internal hose 94 using the quick release hose coupler 93, fills the high pressure air to the airbags 41, and disconnects the hose coupler 93. The user then moves from the inside of the building to the compartment 51 through the rotatable frame 81 with hands grabbing the frame, reaches the bottom portion of the compartment 51 by placing foot into the foot slot 46, lowers the body, and fastens the safety belt 53. When ready, the dropping parts are released by the damper quick release 87 and the lowered body 52 will move down with the damper 40 and the parachute 60 will be extended, released from the clip 88, and deployed. The rotatable frame 81 will rotate back by its springs 85. In case the damper 40 or parachute 60 is stuck on trees or the like, the descent cord 54 will be used to make the user descend to the ground. As soon as the ground is reached, the user will unbuckle the safety belt 53, exit the damper 40, and release the high pressure air with the escape valves 96.

It is to be understood that the present invention is not limited to the above-mentioned embodiments, but encompasses any and all embodiments within the following scope of the claims.

What is claimed is:

1. A high-rise building escape apparatus, for providing a user with a safety device to exit a high-rise building in the event of a fire, comprising:
    a damper having a concave shape, a middle and including a plurality of independent airbags, a plurality of center slots for making said damper more stable during a descent, a plurality of side slots configured to stabilize said damper during said descent, and a plurality of internal hoses placed inside said airbags for distributing air to said airbags;
    a compartment in said middle of said damper and having an open top side;
    a side metallic net attached to a side of said damper that forms an inclined side wall;
    a bottom metallic net attached to a bottom of said damper and configured to reduce damage to said airbags upon landing;
    a parachute placed above said damper for reducing terminal velocity, said parachute including a canopy, a plurality of lines connecting said parachute to a top edge of said damper, and string attached to a bottom edge of said canopy for obtaining a circular edge of said canopy;
    an air source system comprising an air compressor powered by a battery, an inflator using stored gas, a pyrotechnic inflator, or combinations thereof;
    a support including a fix frame that is configured to attach to a sill of a window or on a balcony, a rotatable frame placed on said fix frame, a clip attached to said rotatable frame for holding a middle of said canopy until deployment of said parachute, a plurality of hinges about said rotatable frame connecting said rotatable frame to said fix frame, a plurality of springs affixed to said rotatable frame and said fix frame, a latch to fasten said rotatable frame to said fix frame, and a screw attached to said fix frame for setting said fix frame;
    an external hose connected to said air source system;
    a quick release hose coupler that couples said internal hose and said external hose;
    a safety belt attached to said compartment; and
    a plurality of packing belts connected to said rotatable frame for wrapping said parachute, said damper, said side metallic net, said bottom metallic net, and said safety belt.

2. The high-rise building escape apparatus of claim 1, further including a descent cord placed in said compartment.

3. The high-rise building escape apparatus of claim 1, wherein said damper has a check valve attached to each of said internal hoses, a plurality of escape valves attached to said airbags configured for releasing the air in said airbags, and foot slots placed on a wall of said compartment.

4. The high-rise building escape apparatus of claim 1, wherein said airbags are made of a fireproof and airtight material.

5. The high-rise building escape apparatus of claim 1, wherein said parachute has a center hole and a plurality of side holes configured to stabilize said parachute during said descent.

* * * * *